United States Patent
Majkowski et al.

(10) Patent No.: US 11,855,958 B2
(45) Date of Patent: *Dec. 26, 2023

(54) SELECTION OF AN EGRESS IP ADDRESS FOR EGRESS TRAFFIC OF A DISTRIBUTED CLOUD COMPUTING NETWORK

(71) Applicant: CLOUDFLARE, INC., San Francisco, CA (US)

(72) Inventors: Marek Przemyslaw Majkowski, Warsaw (PL); Braden Michael Ehrat, Monticello, IL (US); Sergi Isasi, San Francisco, CA (US); Dane Orion Knecht, Austin, TX (US); Dina Kozlov, San Francisco, CA (US); Rustam Xing Lalkaka, San Francisco, CA (US); Eric Reeves, Austin, TX (US); Oliver Zi-gang Yu, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,828

(22) Filed: Sep. 6, 2022

(65) Prior Publication Data
US 2022/0417211 A1   Dec. 29, 2022

Related U.S. Application Data

(63) Continuation of application No. 17/409,535, filed on Aug. 23, 2021, now Pat. No. 11,438,302.
(Continued)

(51) Int. Cl.
*H04L 29/08* (2006.01)
*H04L 29/06* (2006.01)
*H04L 61/5007* (2022.01)

(52) U.S. Cl.
CPC ................ *H04L 61/5007* (2022.05)

(58) Field of Classification Search
CPC . H04L 61/5007; H04L 61/2015; H04L 67/10; H04L 67/1021; H04L 67/1002; H04L 67/28
(Continued)

(56) References Cited

U.S. PATENT DOCUMENTS

| | | | |
|---|---|---|---|
| 8,438,240 B2 | 5/2013 | Prince et al. | |
| 9,119,143 B2 | 8/2015 | Melick et al. | |

(Continued)

OTHER PUBLICATIONS

Final Office Action, U.S. Appl. No. 17/409,535, dated Jan. 14, 2022, 15 pages.
(Continued)

*Primary Examiner* — Ruolei Zong
(74) *Attorney, Agent, or Firm* — NICHOLSON DE VOS WEBSTER & ELLIOTT LLP

(57) ABSTRACT

A map of IP addresses of a distributed cloud computing network to one or more groupings is stored. The IP addresses are anycast IP addresses for which compute servers of the distributed cloud computing network share. These IP addresses are to be used as source IP addresses when transmitting traffic to destinations external to the cloud computing network. The map is made available to external destinations. Traffic is received at the distributed cloud computing network that is destined to an external destination. An IP address is selected based on the characteristic(s) applicable for the traffic and the map. The distributed cloud computing network transmits the traffic to the external destination using the selected IP address.

18 Claims, 8 Drawing Sheets

Related U.S. Application Data

(60) Provisional application No. 63/197,284, filed on Jun. 4, 2021, provisional application No. 63/200,351, filed on Mar. 2, 2021.

(58) Field of Classification Search
USPC .......................................................... 709/245
See application file for complete search history.

(56) References Cited

U.S. PATENT DOCUMENTS

| | | | | |
|---|---|---|---|---|
| 9,680,951 | B1* | 6/2017 | Graham-Cumming | H04L 45/566 |
| 9,961,066 | B1* | 5/2018 | Kitchen | H04L 63/0807 |
| 10,320,628 | B2* | 6/2019 | Wan | H04L 43/04 |
| 10,498,812 | B1* | 12/2019 | Varda | H04L 67/1095 |
| 2012/0151051 | A1* | 6/2012 | Zhang | H04L 67/1063 709/224 |
| 2013/0080575 | A1* | 3/2013 | Prince | H04L 61/25 709/217 |
| 2015/0005060 | A1* | 1/2015 | Shankar | G07F 17/3239 463/26 |
| 2018/0048666 | A1* | 2/2018 | Alderson | H04L 63/1425 |
| 2018/0048730 | A1* | 2/2018 | Knecht | H04L 69/04 |
| 2019/0319919 | A1* | 10/2019 | Knecht | H04L 67/1031 |
| 2021/0075729 | A1* | 3/2021 | Fedorov | H04L 47/125 |

OTHER PUBLICATIONS

Non-Final Office Action, U.S. Appl. No. 17/409,535, dated Nov. 5, 2021, 13 pages.
Notice of Allowance, U.S. Appl. No. 17/409,535, dated Apr. 27, 2022, 7 pages.

* cited by examiner

US 11,855,958 B2

SELECTION OF AN EGRESS IP ADDRESS FOR EGRESS TRAFFIC OF A DISTRIBUTED CLOUD COMPUTING NETWORK

CROSS-REFERENCE TO RELATED APPLICATIONS

This application is a continuation of Ser. No. 17/409,535, filed Aug. 23, 2021, which claims the benefit of U.S. Provisional Application No. 63/200,351, filed Mar. 2, 2021, and U.S. Provisional Application No. 63/197,284, filed Jun. 4, 2021, which are hereby incorporated by reference.

FIELD

Embodiments of the invention relate to the field of a distributed cloud computing network; and more specifically, to the selection of an egress IP address for egress traffic of a distributed cloud computing network.

BACKGROUND

Requests from internet client devices are transmitted to origin servers to fetch the content that the user is requesting. Some origin servers must know where the client is located so that they can serve localized content and/or add location-based restrictions. For instance, some origin servers have regulations and/or licenses that limit the serving of content to users in a certain region or country. For example, an origin server in the United Kingdom may be legally or contractually required to only serve content to users located in the United Kingdom. If such an origin server receives traffic from a known IP that may be used for spoofing locations (e.g., a Virtual Private Network (VPN)), the origin server may be required to block that traffic. Further, if the origin server performs a geolocation database lookup of the IP address and that IP address is of a VPN server (or other server that is not the client device), the determined location will not necessarily be that of the client device. As another example, some origin servers may want to provide different content for users in different locations. For instance, an origin server may want to provide an English version of the website for users in predominantly English-speaking countries and a French version of the website for users in France. Although standardized methods to specify language content exist in some protocols, like Accept-Language in HTTP, they are often ignored in favor of more accurate IP based geolocation.

Anycast networks, which are commonly used by content delivery networks (CDNs) and other cloud platforms, are conventionally only used at the server-side for bidirectional layer-4 connections such as Transmission Control Protocol (TCP) or User Datagram Protocol (UDP). Anycast allows the same IP address space to be used by many servers by advertising the same IP subnet(s). An inbound-connecting client connects to the server that is closest to the client in terms of routing protocol configuration (e.g., Border Gateway Protocol (BGP) configuration) according to an anycast implementation as determined by the network infrastructure (e.g., router(s), switch(es), and/or other network equipment). Outbound connections, however, where the CDN or cloud platform server acts as the client and connects to an origin server for example, conventionally use separate unicast IP addresses. This is because layer 4 protocols (e.g., TCP or applications on top of UDP) typically require state to be kept on both sides of the connection so return packets need to arrive at the same host that initiated the connection.

SUMMARY

Selecting an egress IP address for egress traffic in a distributed cloud computing network is described in an embodiment. A mapping of egress IP addresses to one or more groupings is stored and accessible at the distributed cloud computing network. The mapping may be used for segmenting traffic and may be based on the characteristic(s) of users, characteristic(s) of the client devices, characteristic(s) of the client network applications, and/or characteristics of internet traffic. For example, a mapping of egress IP addresses to geographic locations may be stored. The map is made available to destinations external to the distributed cloud computing network. Traffic is received at the distributed cloud computing network that is destined to an external destination. An egress IP address is selected based on characteristic(s) applicable for the traffic and the map. The distributed cloud computing network transmits the traffic to the external destination using the selected egress IP address.

In an embodiment, the egress IP addresses are anycast IP addresses and advertised by multiple or all the data centers of the distributed cloud computing network. As a result, it is possible that traffic is sent and received by two different servers of the distributed cloud computing network. In an embodiment, a server that receives return traffic that it did not originate forwards the return traffic to a server that originated the traffic for further processing. In an embodiment, prior to transmitting the traffic to the origin, an exit data center is determined that is expected to receive the return traffic; and the traffic is proxied to that data center.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
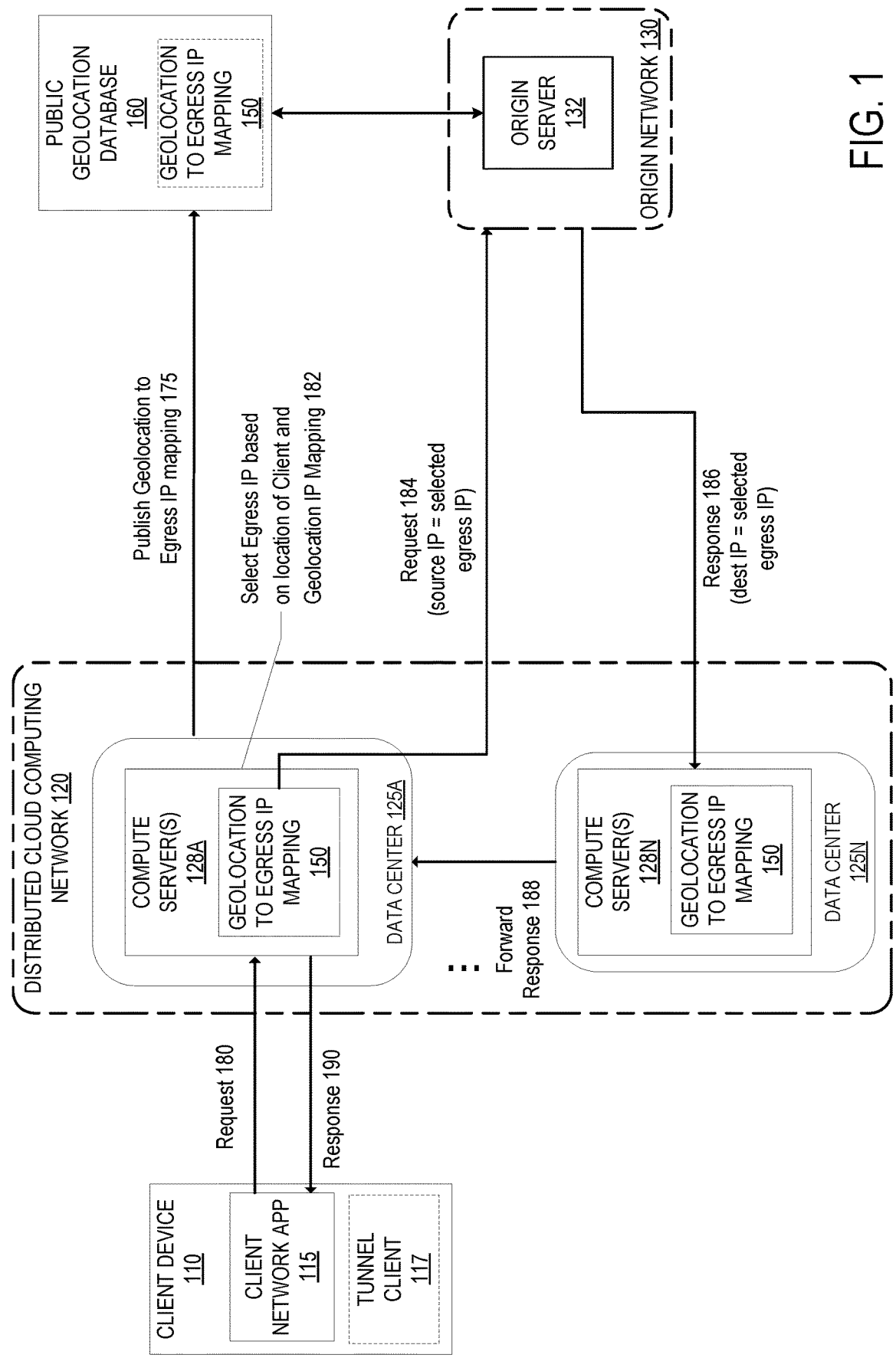
FIG. 1 illustrates a system for selecting an egress IP address in a distributed cloud computing network according to an embodiment.

A method and system for selecting an egress IP address for egress traffic in a distributed cloud computing network is described in an embodiment. The distributed cloud computing network includes multiple data centers that are geographically distributed. There may be hundreds to thousands of data centers and each data center includes one or more compute servers. IP traffic destined to an origin network is received at the distributed cloud computing network instead of being received initially at the origin network. Outgoing traffic from the distributed cloud computing network may have different source IP addresses than incoming traffic. For instance, instead of forwarding traffic from a client device with the source IP address of the client device, a particular compute server may transmit the traffic from the client device using an IP address of the distributed cloud computing network as the source IP address. These IP addresses are referred herein as "egress IP addresses." For example, the distributed cloud computing network may provide a VPN service where the source IP address of the client device is not visible to an origin network.

In an embodiment, a mapping of egress IP addresses to one or more groupings is stored and accessible at the distributed cloud computing network. The mapping may be used for segmenting traffic and may be based on the characteristic(s) of users, characteristic(s) of the client devices, characteristic(s) of the client network applications, and/or characteristics of Internet traffic. For example, the egress IP addresses may be mapped to one or more of the following: geographic locations (e.g., countries, regions, cities, latitude/longitude, zones of population using specific dominant language, etc.), organization (e.g., company 1 employees, company 2 employees), bot likelihood, trusted vs untrusted traffic, quality of service to be applied to the traffic, mobile vs non-mobile client device, manufacturer of client device, and/or priority level of the traffic. The distributed cloud computing network receives ingress traffic from client devices that is destined to destinations external to the distributed cloud computing network. The distributed cloud computing network determines characteristic(s) of the users responsible for the traffic, characteristic(s) of the client devices transmitting the traffic, characteristic(s) of the client network applications being used on the client devices transmitting the traffic, and/or characteristic(s) of the ingress traffic itself. The distributed cloud computing network uses the determined characteristic(s) and the mapping of egress IP addresses when selecting egress IP addresses. The traffic may then be segmented according to the segmentation criteria and treated differently if desired.

In an embodiment, the mapping of egress IP addresses is to geographic locations (e.g., countries, regions, cities, latitude/longitude, zones of population using specific dominant language, etc.). This geolocation mapping may be exported or available to public geolocation databases. The geolocation mapping does not necessarily reflect the location of a particular data center. Rather, the mapping may reflect the expected location(s) of the originators of the traffic (e.g., the expected location(s) of requesting client devices). After a request is received at the distributed cloud computing network where the request is destined to an origin network, a geographic location of the requester (e.g., the visiting client device) is determined (e.g., based on the source IP address of the request). An egress IP address is chosen based on the determined location of the requester and the mapping of egress IP addresses to geographic location. For instance, a geohash of the determined location of the requester and a geohash of the mapped geographic locations are compared. The egress IP address that corresponds to the closest geohash of the mapped geographic locations with the geohash of the determined location of the requester is chosen in some embodiments. By way of example, if the determined location of the requester is in Nevada and the closest mapped geographic location is in California, an egress IP address mapped to California may be used. Thus, if the origin network uses a public geolocation database to lookup the location of the IP address (e.g., to serve localized content or to fulfill legal or contractual obligations), the location will be that of the requesting client device and not necessarily of the distributed cloud computing network.

As another example, the mapping of egress IP addresses is to different entities (e.g., organizations such as companies). For example, a group of IP addresses (e.g., a /24 subnet) may be mapped to a first entity and another group of IP addresses (e.g., a different /24 subnet) may be mapped to a second entity. The distributed cloud computing network receives traffic and determines that it is attributable to an entity (e.g., by examining the HTTP host header or through server name indication (SNI), destined for an IP address belonging to that entity) and selects an egress IP address according to the mapping. For example, if the traffic is attributed to the first entity, the distributed cloud computing network uses an egress IP address from one of the group of IP addresses mapped to that first entity. The entity may then, for example, configure their network to accept traffic/connections only from the mapped group of IP addresses. For example, the first entity may configure their network to accept traffic/connections with source IP addresses belonging to the first group of IP addresses.

In an embodiment, the egress IP addresses are anycast IP addresses. In such an embodiment, the egress IP addresses are advertised by multiple or all the data centers. As such, connections to the origin can be initiated, using the same egress IP address, from multiple compute servers and/or multiple data centers at the same time. Since the egress IP addresses are anycast IP addresses, return traffic may be received at multiple compute servers and/or multiple data centers. Thus, it is possible that traffic sent from a compute server and/or data center originating a connection may not receive the response traffic directly from the origin (instead the traffic could arrive at a different compute server and/or data center due to the different compute server being closer to the origin than the originating compute server according to an anycast implementation). The response traffic may be forwarded from the different compute server to the originating compute server for further processing and transmission back to the requesting client.

The egress IP addresses and port space may be split across compute servers, data centers, and/or data center groups dynamically. For instance, IP addresses that are geolocated in a particular country (e.g., United States) may be scaled up or down depending on load. A system of record (SOR) can be used for determining the appropriate egress IP address and port. For instance, a control process running in a data center may consult the SOR to determine the egress IP address and port to allocate and/or use.

The SOR can be hierarchical. For instance, the top layer of the hierarchy may have one or more advertised egress IP subnets (e.g., a /24 subnet) maintained by a set of multiple groups (e.g., regions) of data centers. Each group includes one or more data centers, and each data center maintains the set of advertised IP subnets. For example, there may be a United States group that includes multiple data centers located in the United States that advertise a first IP subnet, and a European group that includes multiple data centers that advertise a second, different, IP subnet. The mapping from subnet to data centers may be relatively constant (e.g., changing no more often than weekly).

The next layer of the SOR hierarchy may be a data center layer. For example, within each group of data centers, each data center may be assigned one or more IP addresses (e.g., one or more /32 IP addresses) from the IP subnet advertised by the group. The IP address assignment is stored in a group database that is available to the data centers of the group. The IP address assignment may change more frequently than the subnet mapping. For example, the IP address to data center mapping may change hourly.

The next layer of the SOR hierarchy may be a compute server layer. Each compute server of the data center reserves a port range on a specific data center allocated egress IP address. Port range can be reserved in blocks of a predefined amount (e.g., 1000 ports). The ports on a specific address do not overlap within the data center. For instance, a first compute server within the data center may be allocated ports 10000-10999 on a specific IP address and a second compute server within the data center may be allocated ports 11000-11999 on the same IP address. The reserved port range allocations are stored in a database. The port range allocations change more frequently than the IP address assignment. For example, the port range allocations may change on the order of minutes.

In cases where the egress IP addresses are anycast IP addresses, a compute server and/or data center that receives ingress traffic from a client device that is destined to an external destination, proxies the layer-4 connection (e.g., a TCP connection) to a different compute server and/or data center that is expected to receive return traffic for this connection, according to an embodiment. The compute server and/or data center that receives ingress traffic from a client device is sometimes referred herein as the entry compute server and/or entry data center, and the different compute server and/or data center is sometimes referred herein as the exit compute server and/or exit data center. For instance, if the closest compute server and/or data center to the origin (as determined by an anycast implementation) is different from the compute server and/or data center that receives ingress traffic from a client device, it is likely that the closest compute server and/or data center from the origin will receive the return traffic for the connection. In such a case, the entry compute server and/or data center proxies the L4 connection to the exit compute server and/or exit data center in an embodiment. The exit compute server makes the L4 connection to the origin. The return traffic may be forwarded from the exit compute server back to the entry compute server and/or data center for transmission back to the requesting client.

FIG. 1 illustrates a system for selecting an egress IP address in a distributed cloud computing network according to an embodiment. The distributed cloud computing network 120 includes multiple data centers 125A-N. There may be hundreds to thousands of data centers, for example. The data centers 125A-N are geographically distributed (e.g., throughout the world). The data centers 125A-N include one or more compute server(s) 128A-N, respectively. Each data center 125 can also include one or more control servers, one or more DNS servers (e.g., one or more authoritative name servers, one or more proxy DNS servers), and/or one or more other pieces of network equipment such as router(s), switch(es), and/or hubs. In an embodiment, each compute server 128 within a data center 125 may process IP traffic (e.g., HTTP/S, SPDY, FTP, TCP, UDP, IPSec, SIP, or other IP protocol traffic). The data centers 125A-N are connected across the public internet. The system also includes the origin network 130 that includes the origin server 132. The origin network 130 is the origin for IP traffic and is a destination that is external to the distributed cloud computing network 120.

The system includes the client device 110 that is a computing device (e.g., laptop, desktop, smartphone, mobile phone, tablet, gaming system, wearable device, Internet-of-Things (IoT) device, set-top box, etc.) that can access network resources through a client network application 115 (e.g., a browser, a mobile application, or other network application). The client device 110 may execute a tunnel client 117 (e.g., VPN client, local forward proxy, or other tunnel client) as part of the client network application 115 or connected to the client network application 115. The tunnel client 117 is operative to establish a tunnel connection (e.g., a VPN connection) with one of the compute servers within the distributed cloud computing network 120. By way of example, the first compute server may be the compute server that connects with the client device over the tunnel because is closest to the client device in terms of routing protocol configuration (e.g., Border Gateway Protocol (BGP) configuration) according to an anycast implementation as determined by the network infrastructure (e.g., router(s), switch(es), and/or other network equipment). For instance, the tunnel client 117 may establish a VPN tunnel with the VPN server executing on one of the compute servers 128 of the data centers 125A-N. While a single client device is illustrated, any number of client devices can be in communication with each one of the servers 128A-N of the data centers 125A-N.

The tunnel client 117 may register with the system including generating a random keypair (public key and private key). In an embodiment, during registration, an initial tunnel route configuration may be transmitted to the tunnel client 117 that specifies the compute server 128A as the endpoint of the tunnel. In another embodiment, the initial tunnel route configuration specifies the anycast IP address shared between the compute servers 128A-N. In such an embodiment, the compute server 128A connects to the tunnel client 117 because it is the one of the compute servers 128A-N that is closest to the client device 110 in terms of routing protocol configuration (e.g., BGP configuration) according to an anycast implementation.

The client network application 115 transmits a request 180 that is received at one of the compute server(s) 128A of the data center 125A. The request 180 may be transmitted over a VPN tunnel established between the client device 110 and the compute server 128A. The request 180 is destined for a destination that is external to the distributed cloud computing network 120 (e.g., a destination handled by the origin server 132). Outgoing traffic from the distributed cloud computing network 120 may have different source IP addresses than incoming traffic. For instance, instead of forwarding the request 180 from the client device 110 with the source IP address of the client device, the compute server 128A may transmit the traffic from the client device using an egress IP address (an IP address of the distributed cloud computing network 120).

The compute server(s) 128A-N store or have access to a mapping of egress IP addresses to one or more groupings. The mapping may be used for segmenting traffic and may be based on characteristic(s) of users, characteristic(s) of client devices, characteristic(s) of client network applications, and/or characteristics of internet traffic. For example, the egress IP addresses may be mapped to one or more of the following: geographic locations (e.g., countries, regions, cities, latitude/longitude, zones of population using specific dominant language, etc.), organization (e.g., company 1 employees, company 2 employees), bot likelihood, trusted vs untrusted traffic, quality of service to be applied to the traffic, mobile vs non-mobile client device, manufacturer of client device, and/or priority level of the traffic. The example illustrated in FIG. 1 shows a mapping of geolocations to egress IP addresses and selecting egress IP addresses based on geolocations of the client devices. However, the egress IP addresses may be selected based on other characteristic(s) as described above.

The geolocation to egress IP mapping 150 maps egress IP addresses to geographic locations (e.g., countries, regions, cities, latitude/longitude, zones of population using specific dominant language, etc.). The geolocation mapping may be published 175 or otherwise available to public geolocation databases such as the public geolocation database 160 or be available for access (e.g., downloadable). The origin servers may use the mapping (e.g., through accessing the public geolocation database 160 or downloading the mapping) to lookup the geolocation of IP addresses (e.g., to serve localized content or to fulfill legal or contractual obligations). The compute servers may use one of the IP addresses on the geolocation to egress IP mapping 150 when transmitting outgoing traffic (e.g., to the origin server 132). The geolocation to egress IP mapping 150 does not necessarily reflect the location of a particular data center or compute server. Rather, the mapping may reflect the determined location(s) of the originators of the traffic (e.g., the determined location(s) of requesting client devices).

The compute server 128A that receives the request 180 determines the geographic location of the request 180. For example, the compute server 128A may access the public geolocation database 160 to determine the geolocation of the request based on the source IP address of the request. As another example, if the client device can provide location services (e.g., through use of GPS or other geolocation), the compute server 128A may request the client device 110 provide its location and/or otherwise receive the location data from the client device 110. To prevent the tunnel client 117 from forging such parameters, the compute server 128A may require cryptographic authentication of sensor information from the client device operating system or hardware.

The compute server, at operation 182, selects an egress IP based on the determined location of the requester and the geolocation to egress IP mapping 150. For instance, a geohash of the determined location of the requester and a geohash of the mapped geographic locations are compared. The egress IP address that corresponds to the closest or otherwise preferred geohash of the mapped geographic locations with the geohash of the determined location of the requester may be chosen. In an embodiment, each compute server may use any of the IP addresses on the geolocation to egress IP mapping 150 regardless of the location of the client and the location of the compute server. For instance, a compute server located in Europe may use an egress IP address that is mapped to California if the determined geolocation of the requester is in California. In another embodiment, compute servers can only select certain IP addresses that are in the same geographic region. In such an embodiment using the same example, the compute server located in Europe may only be allowed to use egress IP addresses that are mapped to locations in Europe. If that compute server receives traffic from a client that has a determined geolocation in California, the compute server may transmit the traffic to a compute server that is allowed to use egress IP addresses that are mapped to California (e.g., a compute server located in California) and that compute server will transmit the outgoing traffic. In the example shown in FIG. 1, the compute server 128A that received the request selects an egress IP address to use based on the determined geolocation of the client device 110 and the geolocation to egress IP mapping 150. The compute server 128A transmits the request 184 to the origin server 132 that uses the selected egress IP address as the source IP address.

In an embodiment, the egress IP addresses may be anycast IP addresses and advertised by multiple or all the data centers 125A-N. If the egress IP addresses are anycast IP addresses, return traffic may be received at multiple compute servers and/or multiple data centers. Thus, it is possible that traffic sent from a compute server and/or data center originating a connection may not receive the response traffic directly from the origin (instead the traffic could arrive at a different compute server and/or data center due to the different compute server being closer to the origin than the originating compute server according to an anycast implementation). The response traffic may be forwarded from the different compute server to the originating compute server for further processing and transmission back to the requesting client.

For instance, as illustrated in FIG. 1, the origin server 132 transmits the response 186 that has a destination IP address as the selected egress IP address. However, the response 186 is received at a compute server 128N of the data center 125N instead of the compute server 128A that transmitted the request due to the selected egress IP address being an anycast IP address. Since the compute server 128N did not originate the connection, the compute server 128N forwards the response to the compute server 128A at operation 188. The compute server 128A receives this response and transmits the response to the client network application 115 at operation 190. The compute server 128N may perform filtering such as distributed denial of service (DDoS) mitigation, or a network-level firewall, before forwarding traffic to compute server 128A.

In an embodiment, the egress IP addresses and port space is split across compute servers, data centers, and/or data center groups dynamically. A system of record (SOR) can be used for determining the appropriate egress IP address and port. For instance, a control process running in a data center may consult the SOR to determine the egress IP address and port to allocate and/or use. The SOR can be hierarchical.

Figure 2:
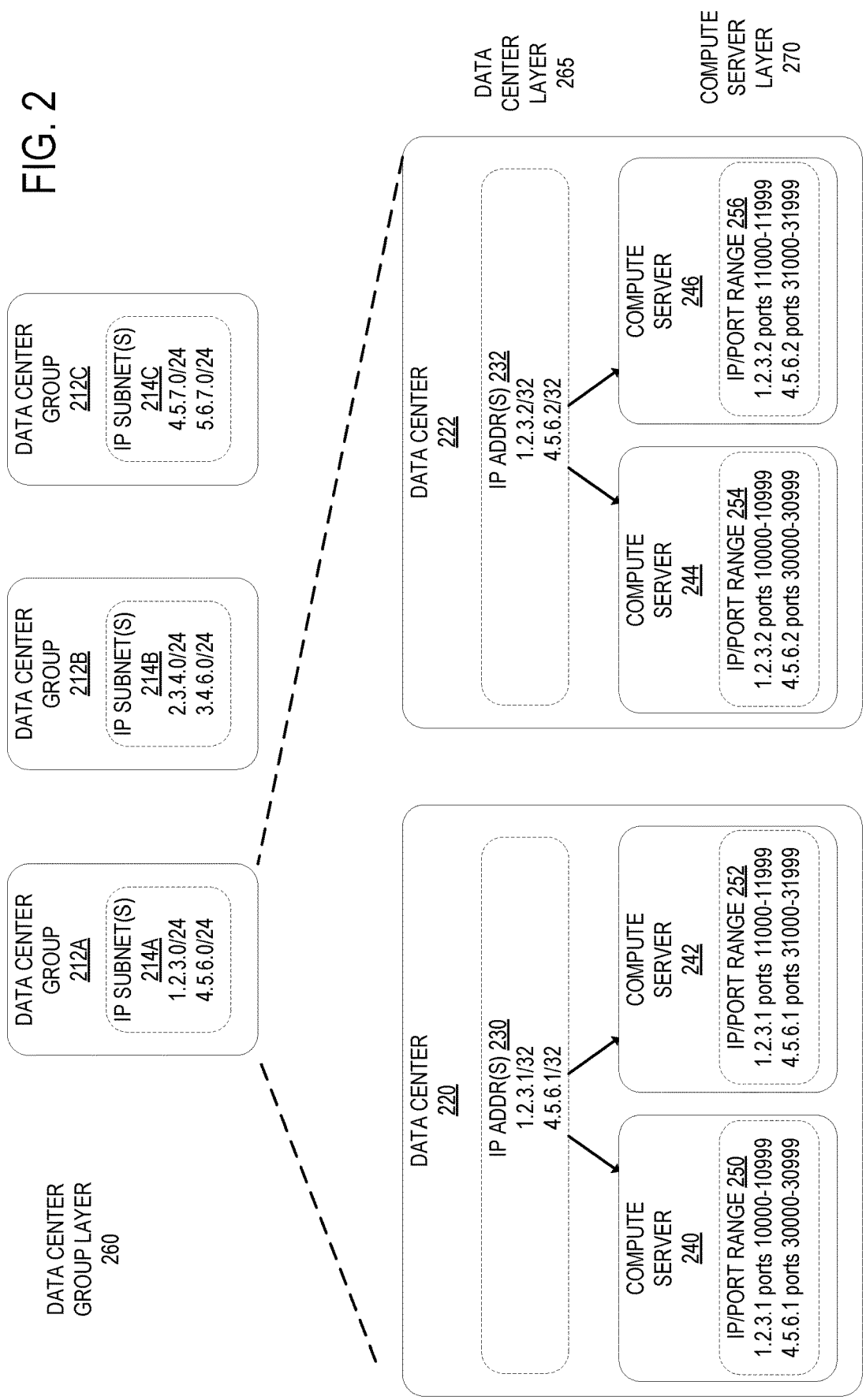
FIG. 2 illustrates an example hierarchy of the system of record according to an embodiment.

FIG. 2 illustrates an example hierarchy of the system of record. The top layer of the hierarchy is the data center group layer 260. The data centers of the distributed cloud computing network 120 are organized into one or more data center groups that each include one or more data centers. A data center group may be organized in several ways such as by geolocation and/or data center type. As an example, a data center group may be defined for data centers in the United States and a data center group may be defined for data centers in Europe. As illustrated in FIG. 2, there are three data center groups 212A-C, respectively. The number of data center groups is exemplary as there may be more or fewer groups. Each data center group advertises one or more IP subnets (e.g., a /24 subnet). In the example shown in FIG. 2, the data center group 212A advertises the IP subnet(s) 214A, the data center group 212B advertises the IP subnet(s) 214B, and the data center group 212C advertises the IP subnet(s) 214C. The IP subnets may be anycast IP addresses. The assignment of subnet to data centers may be relatively constant (e.g., changing no more often than weekly). Thus, the data center group layer 260 represents an IP address subnet level.

The second layer of the hierarchy is the data center layer 265. Within each group of data centers, each data center is assigned one or more egress IP addresses (e.g., one or more /32 IP addresses) from the IP subnet advertised by the group. In an embodiment, the assigned one or more IP addresses are approximated to the location of the data center. For instance, a data center in California may be assigned one or more IP addresses that are mapped to a geographic location in or near California. In another embodiment, the assigned one or more egress IP addresses are not necessarily approximated to the location of the data center. For instance, a data center in California may be assigned one or more IP addresses that are mapped to a geographic location in Europe. As illustrated in FIG. 2, the data center group 212A includes the data center 220 and the data center 222. The number of data centers in a group is exemplary and there may be more or fewer data centers in any group. The data center 220 is assigned the IP address(es) 230 and the data center 222 is assigned the IP address(es) 232. The IP address assignment is stored in a group database that is available to the data centers of the group. The IP address assignment may change more frequently than the subnet mapping. For example, the IP address to data center mapping may change hourly and may have a synchronization latency on the order of minutes. Thus, the data center layer 265 represents a specific IP address level.

The third layer of the hierarchy is the compute server layer 270. Each compute server of the data center reserves a port range on a specific data center allocated egress IP address. Port range can be reserved in blocks of a predefined amount (e.g., 1000 ports). The ports on a specific address do not overlap within the data center. For instance, a first compute server within the data center may be allocated ports 10000-10999 on a specific IP address and a second compute server within the data center may be allocated ports 11000-11999 on the same IP address. As illustrated in FIG. 2, the compute server 240 reserves the port range 250, the compute server 242 reserves the port range 252, the compute server 244 reserves the port range 254, and the compute server 246 reserves the port range 256. The reserved port range allocations are stored in a database. The port range allocations change more frequently than the IP address assignment. For example, the port range allocations may change on the order of minutes (e.g., 15 minutes) and may have a synchronization latency of seconds. Thus, the compute server layer 270 represents a specific IP address level.

The following data may be globally known in the distributed cloud computing network: the list of IP subnet to data center assignment, the mapping of geolocations to egress IP addresses, and a list of data centers for each data center group. The following data may be known at the data center group level: the IP address(es) assigned to each data center (which may also include a lease expiration). The following data may be known at the data center level: the IP address and port range assigned to each compute server (which may also include a lease expiration).

In an embodiment, the determination of which egress IP to select is performed with an API where given the determined location (e.g., country, city, geohash, radius) of the originator of the traffic (e.g., based on IP address), a best fitting egress IP address is returned (e.g., ordered by distance, ordered by country and then distance, ordered by country, city, and then distance). The API may also be used for determining the compute server that will process the egress traffic and the return traffic. For instance, given a subnet, the API may be able to return: the IP/port-range lease assigned to the querying compute server; the IP address (e.g., /32 IP address) allocated to the local data center with free ports; a list of internal IP addresses of another compute server in the current data center owning leases; a non-allocated IP address (e.g., a /32 IP address) belonging to the current data center group; a list of data centers in the current data center group already owning IP address(es) from the selected subnet; and the data center group that owns the appropriate IP.

Figure 3:
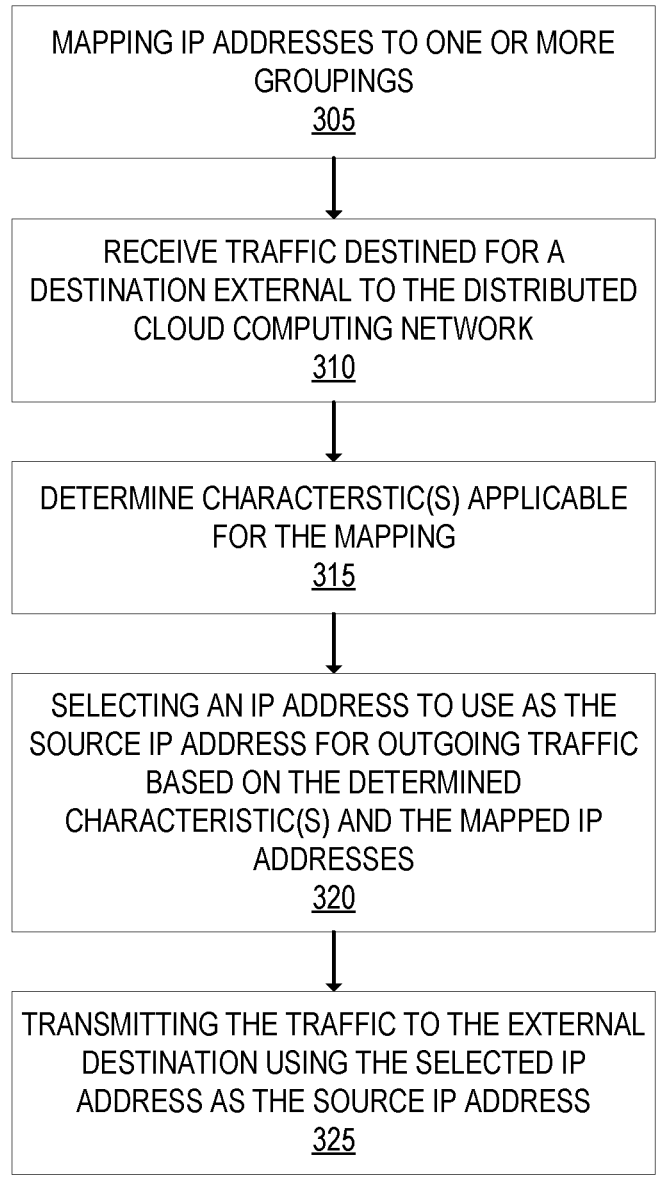
FIG. 3 is a flow diagram that illustrates exemplary operations for selecting an egress IP address for use in outgoing traffic in a distributed cloud computing network according to an embodiment.

FIG. 3 is a flow diagram that illustrates exemplary operations for selecting an egress IP address for use in outgoing traffic in a distributed cloud computing network according to an embodiment. At operation 305, egress IP addresses are mapped to one or more groupings. As an example, the egress IP addresses may be mapped to one or more of the following: geographic locations (e.g., countries, regions, cities, latitude/longitude, zones of population using specific dominant language, etc.), organization (e.g., company 1 employees, company 2 employees), bot likelihood, trusted vs untrusted traffic, quality of service to be applied to the traffic, mobile vs non-mobile client device, manufacturer of client device, and/or priority level of the traffic. The map may be published or otherwise made available to destinations external to the distributed cloud computing network (e.g., origin networks).

Next, at operation 310, a compute server receives traffic destined for a destination external to the distributed cloud computing network. For example, a request may be received from a client device that is addressed to a network location handled by an origin server outside of the distributed cloud computing network. The request may be received at a VPN server over a tunnel from a VPN client that is executing on the client device.

Next, at operation 315, the compute server determines characteristic(s) applicable for the mapping. For instance, the compute server determines characteristic(s) of the users responsible for the traffic, characteristic(s) of the client devices transmitting the traffic, characteristic(s) of the client network applications being used on the client devices transmitting the traffic, and/or characteristic(s) of the ingress traffic itself. As an example, if the mapping is to geolocations, the compute server determines the geolocation of the received traffic. The compute server may access a public geolocation database to determine the geolocation of the request based on the source IP address of the request. As another example, if the client device can provide location services (e.g., through use of GPS or other geolocation), the compute server may request the client device provide its location and/or otherwise receive the location data from the client device. As another example, if the mapping is to an entity, the compute server determines the entity to which the traffic is attributed (e.g., by examining the HTTP host header, SNI, etc.).

Next, at operation 320, the compute server selects an IP address to use as the source IP address for outgoing traffic based on the determined characteristic(s) and the mapped IP addresses to groupings. For instance, if the mapping is to geolocations, the compute server selects an IP address to use as the source IP address for outgoing traffic based on the geolocation of the received traffic and the mapped IP addresses to geographic locations. For instance, a geohash of the determined location of the received traffic and a geohash of the mapped geographic locations are compared. In an embodiment, the selection of the egress IP address is based on distance. For example, the egress IP address that is selected corresponds to the closest geohash of the mapped geographic locations with the geohash of the determined location of the traffic. In another embodiment, the selection of the egress IP address is based on jurisdiction, which may not be the closest in terms of distance. For example, a client device located near the Northern Ireland border may be geographically closer to an egress IP address in Ireland, but the selected egress IP address is an IP address mapped to a UK location. As another example, the cities of Montreal and Ottawa are geographically close, but the default languages are different (e.g., French and English respectively). The jurisdiction-locality may then take precedence over distance in selecting the egress IP address. After the egress IP address is selected, at operation 325 the traffic is transmitted to the external destination using the selected egress IP address as the source IP address of the traffic.

In an embodiment, the compute server that transmits the traffic to the external destination may be different from the compute server that receives the traffic. For example, the selected egress IP address may not be allocated to the compute server that received the traffic. As another example, the compute server that receives the traffic may not have an allocated port. In an embodiment, after determining what egress IP address to use, the particular compute server for transmitting the egress traffic is determined.

The compute server that receives the incoming traffic may access the system of record to determine the geolocated IP/port-range that is allocated to a particular compute server. It is possible that the compute server that receives the traffic has an available port for the egress IP. For example, with reference to FIG. 2, if the compute server 240 receives a request and the IP address 1.2.3.1 is selected as the egress IP address and one of the ports 10000-10999 is available, the compute server 240 may use one of the available ports and transmit the request to the destination origin server. However, if the compute server 240 receives a request and does not have an available port for the selected IP address, the compute server 240 may determine if an available port is available on a different compute server (e.g., the compute server 242). If that other compute server has an available port for the selected IP address, the receiving compute server will forward the traffic to the other compute server within the same data center (e.g., the compute server 240 forwards the traffic to the compute server 242). There may be cases where no compute servers in the data center that received the traffic are allocated the selected egress IP address but another data center in the group has the allocated address and/or port. For instance, if the compute server 240 receives the traffic and the selected egress IP address is the address 1.2.3.2 (allocated to the compute servers 244 and 246 of the data center 222), the compute server 240 may determine to which data center the egress IP address has been allocated (which in this example is the data center 222) and may then query that data center for a compute server that has the allocation. For instance, the compute server 240 may determine that the compute server 244 has an allocated port for the selected IP address 1.2.3.2. In such a case, the compute server 240 forwards the traffic to the compute server 244 for further processing. Also, there may be cases where no other data center in the data center group has the appropriate egress IP allocation (e.g., the data center may not be allocated the subnet). For instance, if the compute server 240 receives the traffic and the selected egress IP address is the address 2.3.4.1, the compute server 240 may determine to which data center group has been allocated that subnet (which is the data center group 212B), and which data center has been allocated the specific IP address, and then querying the specific data center that for which compute server has an allocated port.

Thus, in some cases, a series of operations are performed to determine what compute server is to transmit the egress traffic. It is therefore possible that the local compute server that receives the connection/packets will forward the connection/packets to another compute server because it does not have the appropriate egress IP allocation locally.

As previously described, in some embodiments the egress IP addresses are anycast IP addresses. As a result, it is possible that traffic sent from a compute server and/or data center originating a connection may not receive the response traffic directly from the origin (instead the traffic could arrive at a different compute server and/or data center due to the different compute server being closer to the origin than the originating compute server according to an anycast implementation). The response traffic may be forwarded from the different compute server to the originating compute server for further processing and transmission back to the requesting client.

Figure 4:
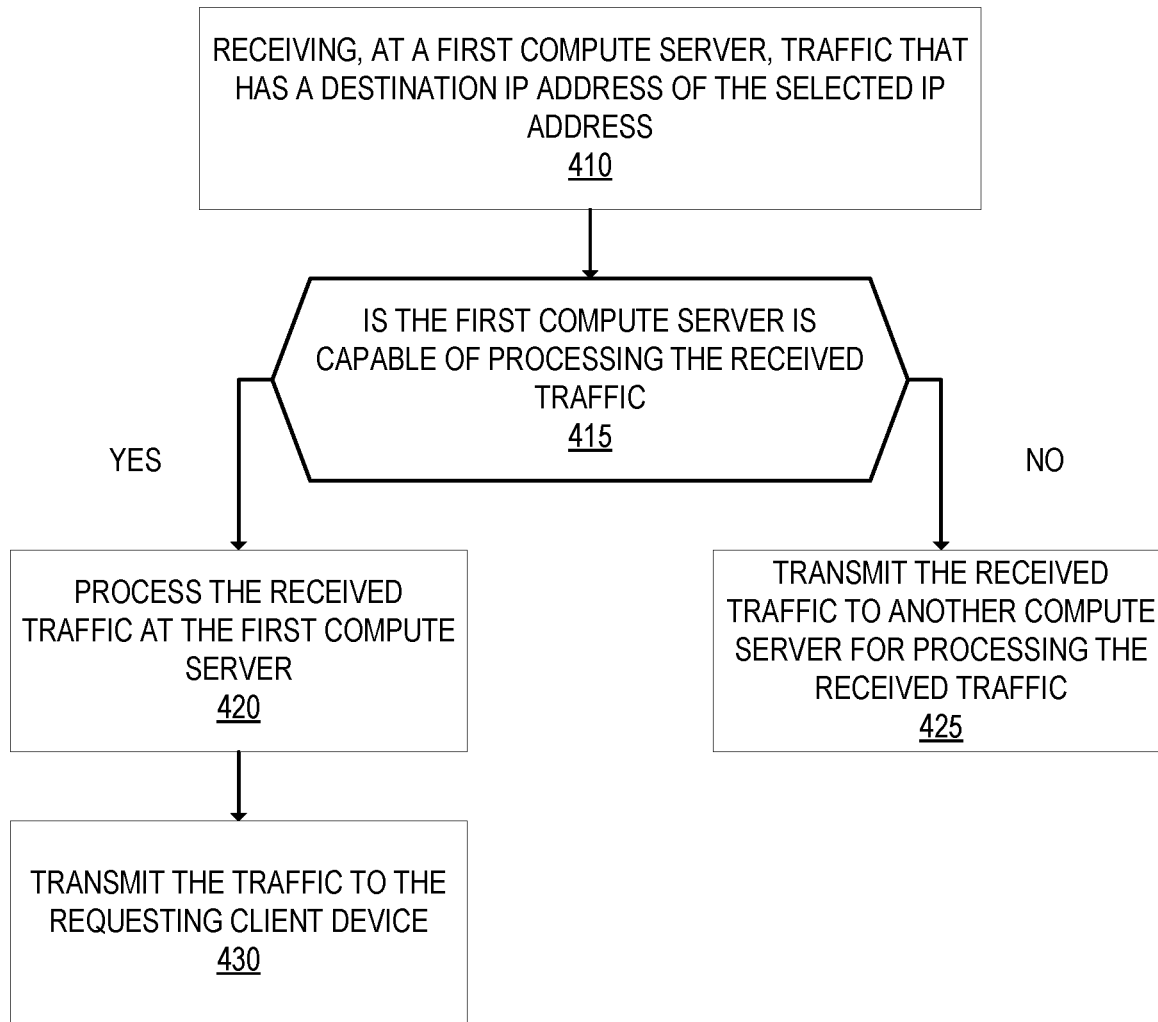
FIG. 4 is a flow diagram that illustrates exemplary operations for processing return traffic at the distributed cloud computing network according to an embodiment.

FIG. 4 is a flow diagram that illustrates exemplary operations for processing return traffic at the distributed cloud computing network according to an embodiment. At operation 410, a first compute server of the distributed cloud computing network receives traffic that has a destination IP address as a selected egress IP address of the distributed cloud computing network. Next, at operation 415, the first compute server determines whether it is capable of processing the received traffic. For instance, the first compute server may determine whether it originated the traffic (e.g., by determining if it has been allocated the IP address and port). If the first compute server is capable of processing the received traffic, then the first compute server processes the received traffic at operation 420 and transmits the traffic to the requesting client device at operation 430. If the first compute server is not capable of processing the traffic, then the first compute server transmits the received traffic to another compute server for processing the received traffic at operation 425.

Like when determining what compute server is to transmit the egress traffic, a series of operations may be performed for determining what compute server transmitted the egress traffic and therefore should process the return traffic (if any). The compute server that receives the return traffic may access the system of record to determine the geolocated IP/port-range that is allocated to a particular compute server. For instance, if the compute server 240 receives a return packet that is addressed to the IP address 1.2.3.1 and port that falls in the range of 10000-10999, the compute server 240 may process the return traffic including transmitting the return traffic to the originating client device. However, if the compute server 240 receives a return packet that is addressed to the IP address 1.2.3.1 with a port that falls in the range of 11000-11999, the compute server 240 was not the originator of the traffic. If the traffic is addressed to an unallocated IP address or to an unallocated port/rage, the compute server may drop the packet. The compute server then determines that the compute server 242 has an appropriate port range and forwards the return packet to the compute server 242 for further processing. As another example, if the compute server 240 receives a return packet that is addressed to an IP address that is not one of the IP address(es) 230 allocated to the data center 220, the compute server 240 determines to which data center the IP address is allocated. For instance, if the return packet is addressed to the IP address 1.2.3.2, the compute server 240 determines that the IP address is allocated to the data center 222. The compute server 240 may query the data center 222 for a compute server that has the IP address/port allocation and then forward the packet to that compute server for further processing. As another example, if the compute server 240 receives a return packet that is addressed to an IP address that is not one of the allocated IP subnet(s) 214A for the data center group 212A (e.g., the IP address is 2.3.4.1), the compute server 240 may determine to which data center group has been allocated that subnet (which is the data center group 212B), and which data center has been allocated the specific IP address, and then querying the specific data center that for which compute server has an allocated port. The compute server may then forward the packet to that compute server for further processing.

Figure 5:
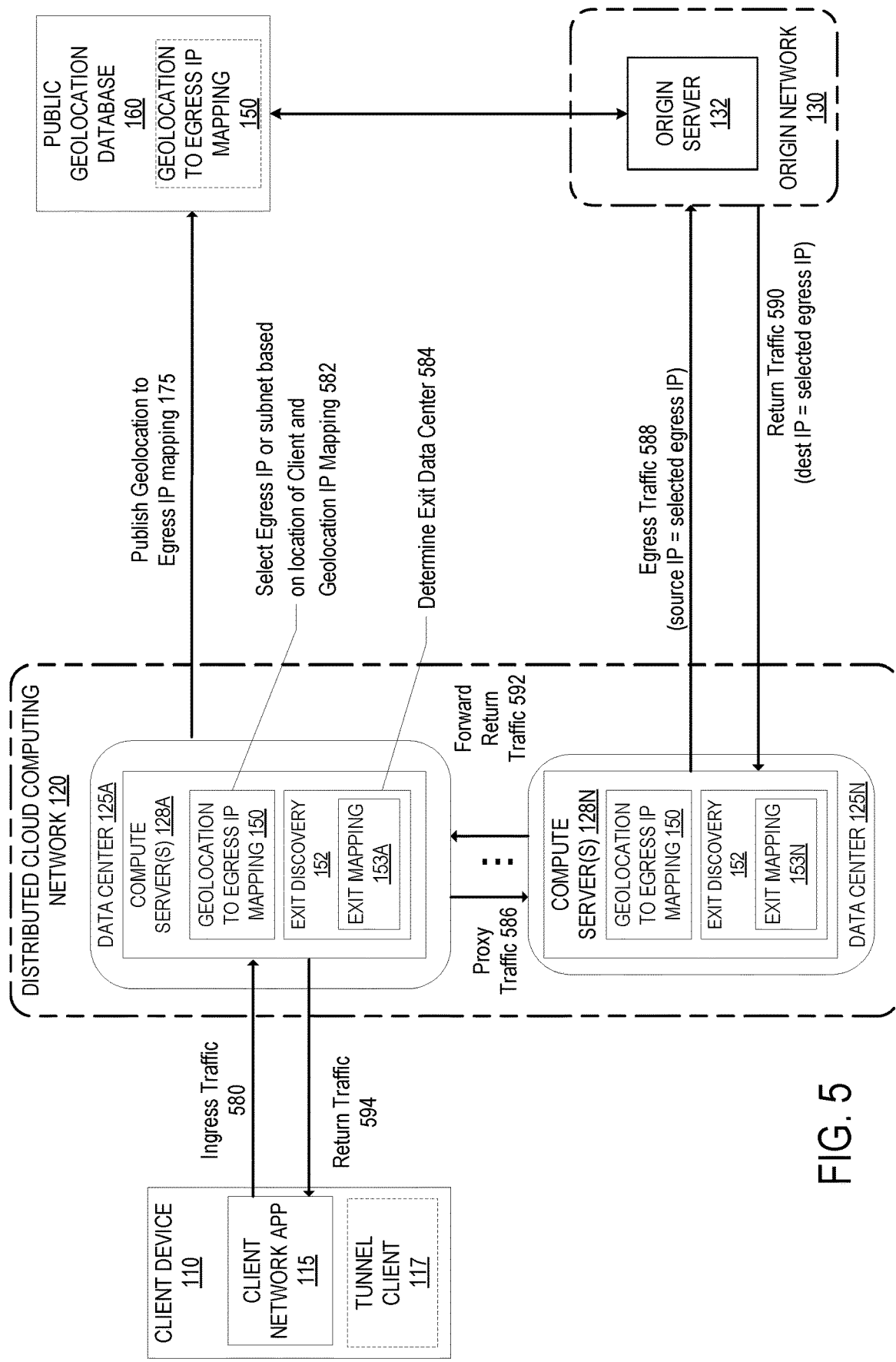
FIG. 5 illustrates a system for proxying L4 connections between an entry compute server and an exit compute server in a distributed cloud computing network according to an embodiment.

FIG. 5 illustrates a system for proxying outbound layer 4 connections from anycast IP addresses in a distributed cloud computing network according to an embodiment. The distributed cloud computing network 120 is like the network shown in FIG. 1. However, unlike the system illustrated in FIG. 1, in the example of FIG. 5, the entry compute server (e.g., a compute server 128A) proxies L4 traffic destined to the origin server 132 to an exit compute server and/or data center (e.g., a compute server 128N of the data center 125N). This is because for the selected egress IP address, which is an anycast IP address, the compute server(s) 128N are the closest in terms of routing protocol configuration according to an anycast implementation to the origin server 132 out of the compute server(s) 128A-N of the data centers 125A-N. The L4 connection is created between a compute server 128N and the origin server 132 and the L4 state is stored at the data center 125N.

The client network application 115 transmits traffic 580 that is received at one of the compute server(s) 128A of the data center 125A. The traffic 580 may be transmitted over a VPN tunnel established between the client device 110 and the compute server 128A. The traffic 580 is destined for a destination that is external to the distributed cloud computing network 120 (e.g., a destination handled by the origin server 132). The destination IP address of the traffic 580 may be an anycast IP address that is advertised at multiple ones of the data centers 125A-N. The traffic 580 may be received at the data center 125A out of the data centers 125A-N because that data center is closest to the client device 110 in terms of routing protocol configuration (e.g., Border Gateway Protocol (BGP) configuration) according to an anycast implementation as determined by the network infrastructure (e.g., router(s), switch(es), and/or other network equipment) between the client device 110 and the data centers 125A-N.

The compute server 128A that receives the incoming traffic 580 determines the geographic location of that incoming traffic 580. For example, the compute server 128A may access the public geolocation database 160 to determine the geolocation of the traffic based on the source IP address of the traffic. As another example, if the client device can provide location services (e.g., through use of GPS or other geolocation), the compute server 128A may request the client device 110 provide its location and/or otherwise receive the location data from the client device 110. To prevent the tunnel client 117 from forging such parameters, the compute server 128A may require cryptographic authentication of sensor information from the client device operating system or hardware.

Outgoing traffic from the distributed cloud computing network 120 may have different source IP addresses than incoming traffic. For instance, instead of forwarding the traffic 580 from the client device 110 with the source IP address of the client device, the traffic that is forwarded to the origin server 132 may use an egress IP address (an IP address of the distributed cloud computing network 120). Like as described in the example of FIG. 1, the compute server 128A, at operation 582, selects an egress IP address or an egress IP subnet (e.g., a /24 subnet) based on the determined location of the requester and the geolocation to egress IP mapping 150. For instance, a geohash of the determined location of the requester and a geohash of the mapped geographic locations are compared. The egress IP address or subnet that corresponds to the closest or otherwise preferred geohash of the mapped geographic locations with the geohash of the determined location of the requester may be chosen.

The compute server(s) 128A-N include the exit discovery component 152. The exit discovery component 152 determines the exit data center (out of the data centers 125A-N) for any external host, such as the external host handled by the origin server 132. The exit discovery component 152 has access to the exit mapping 153A that identifies the exit data center (out of the data centers 125A-N) for a given origin subnet and the selected egress subnet. If there is not an entry for the given origin subnet and the selected egress subnet in the exit mapping 153A, a discovery process is performed to discover the exit data center.

The discovery process includes transmitting a discovery probe. Using TCP as an example, the compute server 128A that receives the traffic 580 transmits a TCP SYN packet to the external host, which in this example corresponds to the origin network 130. This TCP SYN packet uses as its source IP address the selected egress IP address or address from the selected egress IP subnet, which is an anycast IP address. The TCP SYN packet is received at the origin and causes a TCP SYN-ACK to be sent by the origin. The TCP SYN-ACK packet is destined to the source IP address of the TCP SYN packet which is an anycast IP address that is advertised at multiple data centers of the data centers 125A-N. Accordingly, the data center of the data centers 125A-N that receives the TCP SYN-ACK packet is the closest to the origin server (at least with respect to the transmitting compute server) in terms of routing protocol configuration (e.g., BGP configuration) according to an anycast implementation. This data center is also likely to receive other traffic addressed to the selected egress IP address. Accordingly, this data center is mapped as the exit data center at least with respect to the transmitting compute server. If, for example, the compute server 128A receives the corresponding TCP SYN-ACK packet from the origin, then the exit data center is the data center 125A.

Since the source IP address of the TCP SYN packet is an anycast IP address that is advertised at multiple data centers, it is possible that the TCP SYN-ACK packet will be received at a different data center from the one that transmitted the TCP SYN packet. In such a case, in an embodiment the receiving data center gossips or broadcasts to the other data centers that it is receiving traffic from the origin subnet addressed to the selected anycast-egress subnet. The data center that transmitted the TCP SYN packet uses this information to learn the exit data center for the origin subnet and selected anycast-egress subnet pair and populate the exit mapping. For instance, in the example of FIG. 5, the data center 125N is the exit data center for the origin subnet handled by the origin server 132 for the selected anycast-egress subnet. After receiving the gossip from the receiving data center (the exit data center), the transmitting data center reattempts to connect to the external host by proxying its connection through a layer-4 proxy in the exit data center. In an embodiment, the TCP SYN packet for the discovery probe uses a dedicated source port (e.g., 9999) outside of the range of the ephemeral port range. This prevents a case where the receiving data center happens to use the same port number as the discovery probe for other connections.

In another embodiment, each compute server and/or each data center has their own dedicated port used for discovery probes. In such an embodiment, if a receiving data center receives a TCP SYN-ACK packet addressed to that port, it will know which compute server and/or data center transmitted the TCP SYN packet that caused the TCP SYN-ACK packet to be sent. Instead of gossiping or broadcasting to other data centers, the receiving data center may transmit an indication that it is receiving traffic from the origin subnet addressed to the selected anycast-egress subnet to the particular compute server and/or data center that belongs to the discovery probe. In an embodiment, within the data center that receives the result of the discovery probe, the result may be broadcasted to the other compute servers within that data center so that each may learn of the exit data center mapping.

In another embodiment, the compute server of the entry data center that transmits the discovery probe also broadcasts information to the other data centers that indicates it is transmitting the discovery probe and the expected ports and sequence number of the reply packet. A compute server in an exit data center can then match the probe reply packet with a recently received indication that the discovery probe was made and then broadcast, gossip, or directly send a probe-success back to the entry data center when a match is made.

It is possible that the IP address of the origin is also an anycast IP address that is advertised by multiple network elements. In such a case, there may be multiple exit data centers for a particular origin subnet and anycast-egress subnet pair. In an embodiment, the exit mapping is kept only on a per-data center basis or at a regional data center basis. For instance, the exit mapping 153A may be different from the exit mapping 153N.

Referring back to the example of FIG. 5, the exit discovery component 152 of the compute server 128A determines the exit data center for the origin subnet and selected anycast-egress subnet pair at operation 584. For instance, the exit discovery component 152 accesses the exit mapping 153A to determine if there is a mapping of an exit data center for the origin subnet and the selected anycast-egress subnet pair. If there is, that data center is used as the exit data center. If there is not, then the exit discovery component 152 performs the discovery process as described herein. In the example of FIG. 5, the exit discovery component 152 determines that the exit data center for the destination of the ingress traffic 580 and the selected anycast-egress subnet pair is the data center 125N.

After determining the data center 125N is the exit data center, the compute server 128A proxies the traffic through a layer 4 proxy in the exit data center at operation 586. The exit data center may include multiple compute servers each of which may be able to make the L4 connection with the origin. The exit data center is configured such that the same compute server processes the traffic for the initial L4 connection with the origin, the return traffic from the origin, and any further incoming traffic from the client device 110.

For instance, in an embodiment, each compute server of a data center is assigned a unique /32 IP address out of a larger IP address prefix (e.g., /23 or /22 subnet) for the anycast-egress IP subnets, and those compute servers do not advertise the larger IP address prefix but instead advertise the unique /32 IP address. The router or other piece of network equipment in the compute server may advertise the larger IP address prefix. In such a case, a router or other piece of network equipment of the data center may select one of the compute servers that is to serve as the layer 4 proxy with its unique /32 IP address, which can then be used to identify which compute server is processing the traffic. The selection may be based on round-robin, least recently used, depending on load, or other selection.

In another embodiment, fewer than all the compute servers of a data center are assigned a unique /32 IP address. These compute servers do not advertise the larger IP address prefix but instead advertise their unique /32 IP address. The router or other piece of network equipment in the compute server may advertise the larger IP address prefix. In such a case, a router or other piece of network equipment of the data center may select one of the compute servers that is to serve as the layer 4 proxy. If a compute server that is not allocated a unique /32 IP address is selected, that compute server may itself proxy their connections with one of the compute servers that are allocated a unique /32 IP address.

In another embodiment, each compute server of the data center reserves a port range on a specific data center allocated egress IP address. The ports on a specific address do not overlap within the data center. For instance, a first compute server within the data center may be allocated ports 10000-10999 on a specific IP address and a second compute server within the data center may be allocated ports 11000-11999 on the same IP address. A system of record (SOR) can be used for determining the egress IP address and port mapping. For instance, a control process running in a data center may consult the SOR to determine which compute server to forward traffic based on the port.

At operation 588, the compute server 128N of the exit data center 125N transmits the egress traffic to the origin server 132. The egress traffic has the selected egress IP address as the source IP address. The origin server 132 processes the egress traffic and may transmit return traffic. The return traffic is addressed to the selected egress IP address, which as previously described is an anycast IP address. Because the traffic for this connection was sent to the origin server from the determined exit data center, it is likely that the return traffic will be received at the data center 125N, which is shown in operation 590. In such a case, the return traffic is processed by the compute server 128N of the data center 125N that sent the egress traffic to the origin server. For instance, if the compute servers 128N are allocated a unique /32 IP address out of the larger IP address prefix for the anycast-egress IP subnet, the router of the data center 125N may transmit the return traffic directly to the compute server 128N that is assigned the IP address to which the return traffic is addressed. As another example, a control process may access a SOR to determine which compute server 128N to forward the return traffic based on the port.

The compute server 128N processes the return traffic and may forward the return traffic to the entry compute server (e.g., a compute server 128A) at operation 592. The entry compute server receives the traffic and transmits the traffic to the client network application 115 at operation 594.

Figure 6:
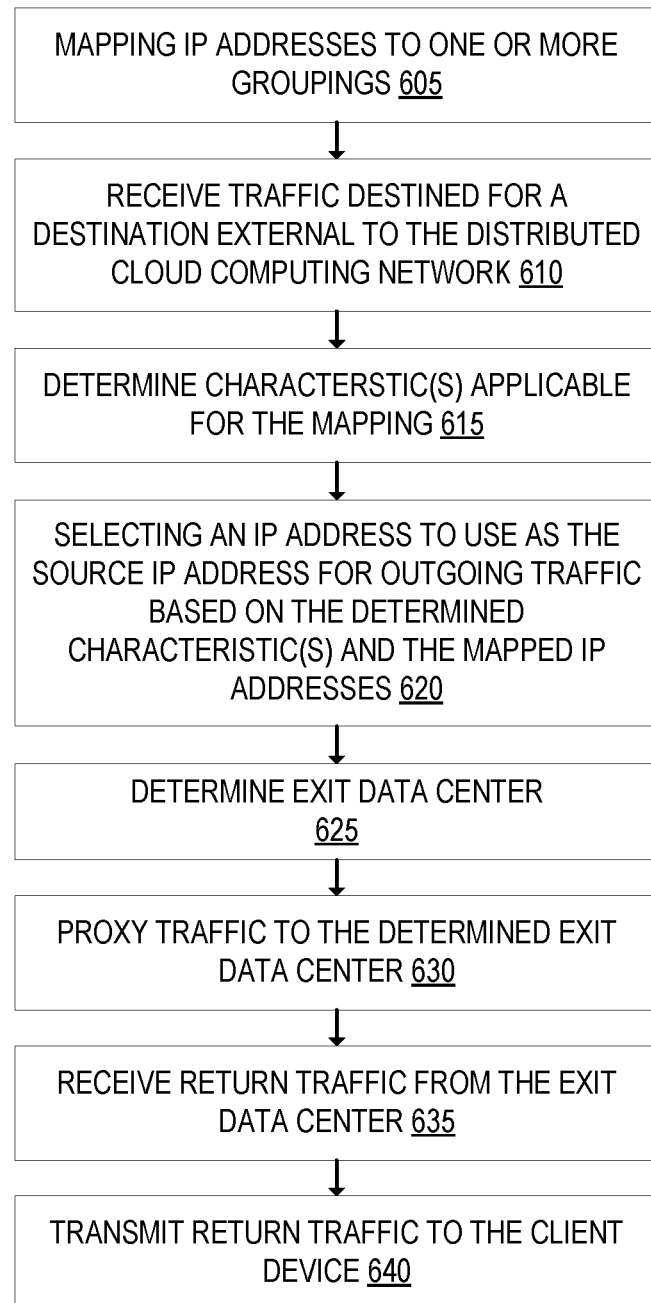
FIG. 6 is a flow diagram that illustrates exemplary operations for proxying L4 connections between an entry compute server and an exit compute server in a distributed cloud computing network according to an embodiment.

FIG. 6 is a flow diagram that illustrates exemplary operations for proxying L4 connections between an entry compute server and an exit compute server in a distributed cloud computing network according to an embodiment. At operation 605, egress IP addresses are mapped to one or more groupings. The operation 605 is like the operation 305 described herein. As an example, the egress IP addresses may be mapped to one or more of the following: geographic locations (e.g., countries, regions, cities, latitude/longitude, zones of population using specific dominant language, etc.), organization (e.g., company 1 employees, company 2 employees), bot likelihood, trusted vs untrusted traffic, quality of service to be applied to the traffic, mobile vs non-mobile client device, manufacturer of client device, and/or priority level of the traffic. The map may be published or otherwise made available to destinations external to the distributed cloud computing network (e.g., origin networks).

Next, at operation 610, a compute server receives traffic associated with a destination external to the distributed cloud computing network. The traffic may be, for example, an HTTP/S request for content from the origin server. The traffic may be received at a VPN server over a tunnel from a VPN client that is executing on the client device. The destination IP address of the incoming traffic may be an anycast IP address that is advertised by each of the data centers 125A-N and the particular data center that receives the traffic may be determined by the network infrastructure according to an anycast implementation. Alternatively, the destination IP address of the traffic may be a unicast IP address that is assigned to the particular compute server that received the packet and selected by a geographical load balancer. The destination IP address of the traffic may be associated with the origin or may belong to the origin and advertised at the data center instead of the origin.

Next, at operation 615, the compute server determines characteristic(s) applicable for the mapping. For instance, the compute server determines characteristic(s) of the users responsible for the traffic, characteristic(s) of the client devices transmitting the traffic, characteristic(s) of the client network applications being used on the client devices transmitting the traffic, and/or characteristic(s) of the ingress traffic itself. As an example, if the mapping is to geolocations, the compute server determines the geolocation of the received traffic. The compute server may access a public geolocation database to determine the geolocation of the traffic based on the source IP address of the traffic. As another example, if the client device can provide location services (e.g., through use of GPS or other geolocation), the compute server may request the client device provide its location and/or otherwise receive the location data from the client device. As another example, if the mapping is to an entity, the compute server determines the entity to which the traffic is attributed (e.g., by examining the HTTP host header, SNI, etc.).

Next, at operation 620, the compute server selects an IP address to use as the source IP address for outgoing traffic based on the determined characteristic(s) and the mapped IP addresses to groupings. For instance, if the mapping is to geolocations, the compute server selects an IP address to use as the source IP address for outgoing traffic based on the geolocation of the received traffic and the mapped IP addresses to geographic locations. For instance, a geohash of the determined location of the received traffic and a geohash of the mapped geographic locations are compared. In an embodiment, the selection of the egress IP address is based on distance. For example, the egress IP address that is selected corresponds to the closest geohash of the mapped geographic locations with the geohash of the determined location of the traffic. In another embodiment, the selection of the egress IP address is based on jurisdiction, which may not be the closest in terms of distance. For example, a client device located near the Northern Ireland border may be geographically closer to an egress IP address in Ireland, but the selected egress IP address is an IP address mapped to a UK location. As another example, the cities of Montreal and Ottawa are geographically close, but the default languages are different (e.g., French and English respectively). The jurisdiction-locality may then take precedence over distance in selecting the egress IP address. The selected IP address is an anycast IP address that is advertised at multiple data centers.

Next, at operation 625, the compute server determines the exit data center for the origin IP address and selected egress IP address pair. For instance, the compute server may access a data structure that associates data centers with origin IP addresses and egress IP addresses to determine if there is an exit data center already known for the origin IP address and selected egress IP address pair. If there is not a known exit data center for the origin IP address and selected egress IP address pair, the compute server performs a discovery process to determine the exit data center. The discovery process may be the same as described herein.

If the exit data center is the data center of which the compute server is part, then the compute server transmits the traffic to the external destination using the selected egress IP address as the source IP address of the traffic. If the exit data center is a different data center, then the compute server proxies the traffic to the different data center at operation 630. A compute server in that different data center transmits the traffic to the external destination using the selected egress IP address as the source IP address of the traffic. The exit compute server may receive return traffic from the external destination and proxy that traffic to the compute server. Thus, at operation 635, the compute server receives return traffic from the different data center. The compute server transmits the return traffic to the requesting client device at operation 640.

Since the selected egress IP address is an anycast IP address that is advertised by multiple data centers, it is possible that a data center different from the determined exit data center receives return traffic for a particular connection. In such a case, that data center may not be able to process the traffic as it does not have knowledge of the underlying connection. For instance, if the data center receives a TCP packet belonging to a connection that it did not establish, the connection may be dropped. As previously described, it is possible that there are multiple exit data centers for a particular origin subnet and anycast-egress subnet pair. In an embodiment, if a server in a data center receives a packet for a connection which it does not have local state but is one of the exit data centers for the origin subnet and anycast-egress subnet pair, that server will broadcast the packet or the packet's state (e.g., the packet's connection tuple and other connection information such as the sequence number) to other known exit data centers for the packet. The data center and/or compute server that receives such a broadcast checks whether that packet matches an established connection. If so, that data center and/or compute server replies to the compute server and/or data center that broadcasts the information so that further packets for the connection will be directly forwarded to the data center and/or compute server that has the established connection.

In an embodiment, upon a data center receiving reply packets that it did not initiate, that data center gossips or broadcasts to the other data centers that it is receiving traffic for that connection. In another embodiment, if the receiving data center is able to determine which other data center and/or compute server to which the traffic belongs, it may forward the traffic to that other data center and/or compute server. That other data center and/or compute server may broadcast or gossip that it is no longer the correct exit data center, which may be done after verifying that the traffic it receives matches an established connection. This broadcast or gossip causes new discovery probes to be sent for new connections.

Although embodiments described herein have described the egress IP address selected based on a mapping of characteristics of the requesting client devices, in an embodiment the egress IP address is not selected in this fashion. In such an embodiment, an exit data center and/or compute server of a distributed cloud computing network is determined for the pair of the origin IP address and egress IP address. The egress IP address may be an anycast IP address. The L4 connection will be proxied from an entry compute server to an exit compute server in the exit data center. The exit compute server makes the L4 connection with the origin. Thus, outbound connections from the distributed cloud computing network to any external host can be made with anycast allowing for improved latency while reducing IP space.

Figure 7:
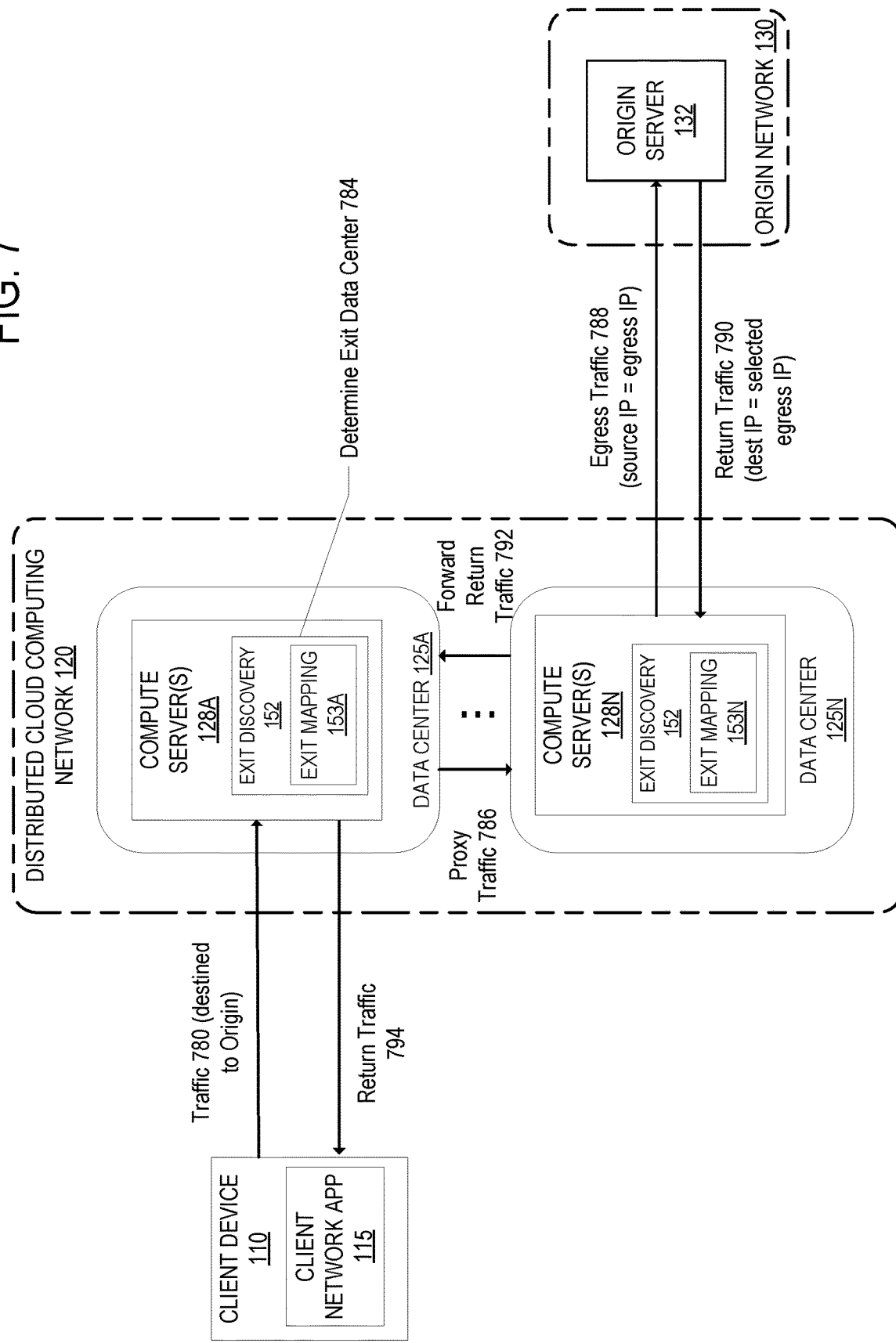
FIG. 7 illustrates a system for proxying L4 connections between an entry compute server and an exit compute server in a distributed cloud computing network according to an embodiment.

FIG. 7 illustrates a system for proxying L4 connections between an entry compute server and an exit compute server in a distributed cloud computing network according to an embodiment. The distributed cloud computing network 120 is like the network shown in FIG. 5. However, unlike the system illustrated in FIG. 5, in the example of FIG. 7 the egress IP address is not selected based on characteristic(s) of the inbound client device, characteristic(s) of the user associated with the inbound internet traffic, characteristic(s) of the inbound client network application, and/or characteristic(s) of the inbound internet traffic. The egress IP address is an anycast IP address that is shared among multiple compute servers of the distributed cloud computing network 120 according to an embodiment. The egress IP address may be selected from multiple possible IP addresses. The selection may be based on round-robin, least recently used, or other selection technique not based on the characteristic(s) described above. In an embodiment, the IP address from which the incoming traffic is addressed is the same IP address used for the egress IP address.

The client network application 115 transmits traffic 780 that is received at one of the compute server(s) 128A of the data center 125A. The traffic 780 may be transmitted over a VPN tunnel established between the client device 110 and the compute server 128A. The traffic 780 is destined for a destination that is external to the distributed cloud computing network 120 (e.g., a destination handled by the origin server 132). Outgoing traffic from the distributed cloud computing network 120 may have different source IP addresses than incoming traffic. For instance, instead of forwarding the traffic 580 from the client device 110 with the source IP address of the client device, the traffic that is forwarded to the origin server 132 uses an egress IP address (an IP address of the distributed cloud computing network 120). The egress IP address is an anycast IP address according to an embodiment.

Like as described with reference to FIG. 5, the exit discovery component 152 determines the exit data center (out of the data centers 125A-N) for any external host, such as the external host handled by the origin server 132. The exit discovery component 152 has access to the exit mapping 153A that identifies the exit data center (out of the data centers 125A-N) for a given origin subnet and the selected egress subnet. If there is not an entry for the given origin subnet and the selected egress subnet in the exit mapping 153A, a discovery process is performed to discover the exit data center, as previously described. Thus, at operation 784, the exit discovery component 152 of the compute server 128A determines the exit data center for the origin subnet and the anycast-egress subnet pair. For instance, the exit discovery component 152 accesses the exit mapping 153A to determine if there is a mapping of an exit data center for the origin subnet and the anycast-egress subnet pair. If there is, that data center is used as the exit data center. If there is not, then the exit discovery component 152 performs the discovery process as described herein. In the example of FIG. 7, the exit discovery component 152 determines that the exit data center for the destination of the ingress traffic 780 and the anycast-egress subnet pair is the data center 125N.

After determining the data center 125N is the exit data center, the compute server 128A proxies the traffic through a layer 4 proxy in the exit data center at operation 786. The exit data center may include multiple compute servers each of which may be able to make the L4 connection with the origin. The exit data center is configured such that the same compute server processes the traffic for the initial L4 connection with the origin, the return traffic from the origin, and any further incoming traffic from the client device 110.

For instance, in an embodiment, each compute server of a data center is assigned a unique /32 IP address out of a larger IP address prefix (e.g., /23 or /22 subnet) for the anycast-egress IP subnets, and those compute servers do not advertise the larger IP address prefix but instead advertise the unique /32 IP address. The router or other piece of network equipment in the compute server may advertise the larger IP address prefix. In such a case, a router or other piece of network equipment of the data center may select one of the compute servers that is to serve as the layer 4 proxy with its unique /32 IP address, which can then be used to identify which compute server is processing the traffic. The selection may be based on round-robin, least recently used, depending on load, or other selection.

In another embodiment, fewer than all the compute servers of a data center are assigned a unique /32 IP address. These compute servers do not advertise the larger IP address prefix but instead advertise their unique /32 IP address. The router or other piece of network equipment in the compute server may advertise the larger IP address prefix. In such a case, a router or other piece of network equipment of the data center may select one of the compute servers that is to serve as the layer 4 proxy. If a compute server that is not allocated a unique /32 IP address is selected, that compute server may itself proxy their connections with one of the compute servers that are allocated a unique /32 IP address.

In another embodiment, each compute server of the data center reserves a port range on a specific data center allocated egress IP address. The ports on a specific address do not overlap within the data center. For instance, a first compute server within the data center may be allocated ports 10000-10999 on a specific IP address and a second compute server within the data center may be allocated ports 11000-11999 on the same IP address. A system of record (SOR) can be used for determining the egress IP address and port mapping. For instance, a control process running in a data center may consult the SOR to determine which compute server to forward traffic based on the port.

At operation 788, the compute server 128N of the exit data center 125N transmits the egress traffic to the origin server 132. The egress traffic has the egress IP address as the source IP address. The origin server 132 processes the egress traffic and may transmit return traffic. The return traffic is addressed to the egress IP address, which as previously described is an anycast IP address. Because the traffic for this connection was sent to the origin server from the determined exit data center, it is likely that the return traffic will be received at the data center 125N, which is shown in operation 790. In such a case, the return traffic is processed by the compute server 128N of the data center 125N that sent the egress traffic to the origin server. For instance, if the compute servers 128N are allocated a unique /32 IP address out of the larger IP address prefix for the anycast-egress IP subnet, the router of the data center 125N may transmit the return traffic directly to the compute server 128N that is assigned the IP address to which the return traffic is addressed. As another example, a control process may access a SOR to determine which compute server 128N to forward the return traffic based on the port.

The compute server 128N processes the return traffic and may forward the return traffic to the entry compute server (e.g., a compute server 128A) at operation 792. The entry compute server receives the traffic and transmits the traffic to the client network application 115 at operation 794.

Although FIG. 7 shows an embodiment where outgoing traffic from the distributed cloud computing network 120 is sent because of incoming traffic being received from an external device (e.g., the client network application 115), embodiments are not so limited. For instance, an internal program running in a data center of the distributed cloud computing network 120 may make an external connection on its own accord. For instance, a caching program executing in the distributed cloud computing network may asynchronously access external websites to fill the cache. In such an example, the IP address(es) that are used may be anycast IP addresses that are shared by multiple compute servers and/or data centers. Thus, in an embodiment, regardless of the cause of the external connection, if an external connection is to be made from a server of the distributed cloud computing network that uses an anycast IP address as the source IP address, the exit data center is determined for the external destination IP address and the anycast IP address pair (e.g., as previously described) and the traffic is proxied to that exit data center (if not the current data center).

Figure 8:
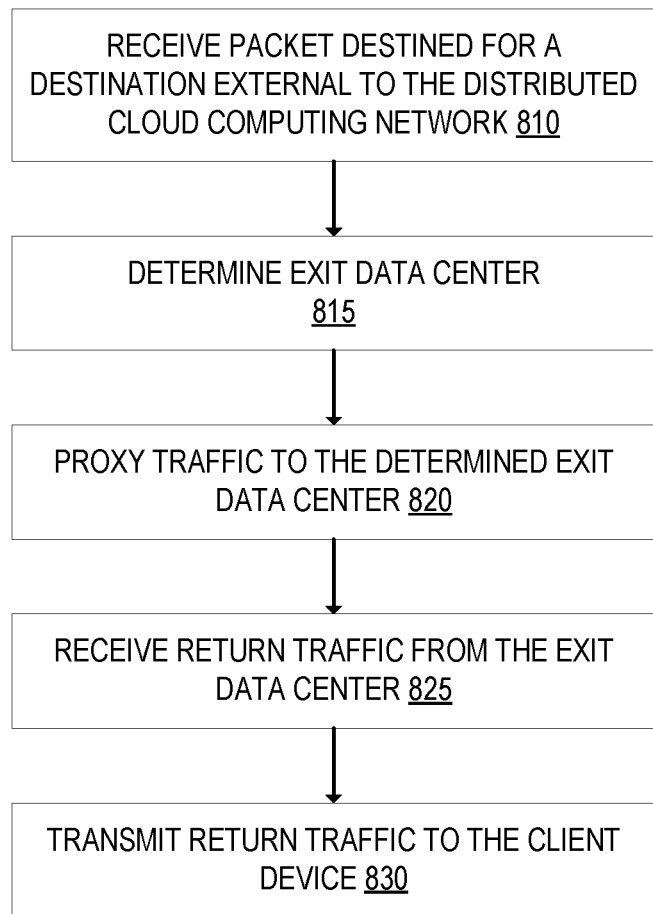
FIG. 8 is a flow diagram that illustrates exemplary operations for proxying L4 connections between an entry compute server and an exit compute server in a distributed cloud computing network according to an embodiment.

FIG. 8 is a flow diagram that illustrates exemplary operations for proxying L4 connections between an entry compute server and an exit compute server in a distributed cloud computing network according to an embodiment. At operation 810, a compute server receives a packet associated with a destination external to the distributed cloud computing network. The destination IP address of the packet may be an anycast IP address that is advertised by each of the data centers 125A-N and the particular data center that receives the packet may be determined by the network infrastructure according to an anycast implementation. Alternatively, the destination IP address of the packet may be a unicast IP address that is assigned to the particular compute server that received the packet and selected by a geographical load balancer. The destination IP address of the packet may be associated with the origin or may belong to the origin and advertised at the data center instead of the origin.

Next, at operation 815, the compute server determines the exit data center for the packet. The determination may be for the pair of the IP address for the origin and the egress IP address. In an embodiment, the egress IP address is an anycast IP address that is shared among multiple compute servers of the distributed cloud computing network. The egress IP may be selected from multiple possible IP addresses. The selection may be based on round-robin, least recently used, or other selection technique not based on the characteristic(s) described above. In an embodiment, the IP address from which the incoming traffic is addressed is the same IP address used for the egress IP address. To determine the exit data center for the packet, the compute server may access a data structure that associates data centers with origin IP addresses and egress IP addresses to determine if there is an exit data center already known for the origin IP address and selected egress IP address pair. If there is not a known exit data center for the origin IP address and selected egress IP address pair, the compute server performs a discovery process to determine the exit data center. The discovery process may be the same as described herein.

If the exit data center is the data center of which the compute server is part, then the compute server transmits the packet to the external destination using the selected egress IP address as the source IP address of the traffic. If the exit data center is a different data center, then the compute server proxies the traffic to the different data center at operation 820. A compute server in that different data center transmits the traffic to the external destination using the selected egress IP address as the source IP address of the traffic. The exit compute server may receive return traffic from the external destination and proxy that traffic to the compute server. Thus, at operation 825, the compute server receives return traffic from the different data center. The compute server transmits the return traffic to the requesting client device at operation 830.

Although FIG. 8 shows an embodiment where a compute server receives traffic that is associated with a destination external to the distributed cloud computing network that causes an external connection to be used to that external destination, embodiments are not so limited. For instance, the external connection can be triggered by an internal program running in a compute server. Thus, instead of operation 810 where a compute server receives a packet, the compute server may determine to transmit outgoing packet to an external destination. If an anycast IP address is used for the outgoing traffic to the external destination, the compute server will determine the exit data center as described in operation 815 and proxy the traffic as described in operation 820 in an embodiment. Of course, if there is not a device originating the incoming traffic (e.g., a client device), operation 830 does not need to be performed. Instead, the compute server receives the return traffic from the exit data center as in operation 825 and internally processes the traffic. Thus, in an embodiment, regardless of the cause of the external connection, if an external connection is to be made from a server of the distributed cloud computing network that uses an anycast IP address as the source IP address, the exit data center is determined for the external destination IP address and the anycast IP address pair (e.g., as previously, and the anycast IP address pair (e.g., as previously described) and the traffic is proxied to that exit data center (if not the current data center).

The preceding description described a distributed cloud computing network that performs various actions. The distributed cloud computing network can provide one or more performance services and/or one or more security services. The one or more performance services can include a content delivery network, caching, video delivery, website optimizations (e.g., asynchronous loading, image optimizations, mobile optimizations), load balancing, intelligent routing, availability, and/or protocol management (e.g., IPv4/v6 gateway). The one or more security services can include DDoS protection, secure session (SSL/TLS) support, web application firewall, threat blocking, privacy protection, access control, compliance, and/or rate limiting. The performance services and security services described above are examples and the distributed cloud computing network may perform different services than described. In an embodiment, each performance service and/or security service can be performed in each data center.

In an embodiment, the content delivery network service may include caching content at the data centers 125A-N (e.g., the distributed cloud computing network 120) to deliver content faster with less latency. In addition, when static content is cached in the geographically distributed network of data centers, the availability of the static content can be maintained even when the origin server fails or goes down. In an embodiment, content caching is based on rules that specify particular behavior for individuals URLs and/or IP addresses, including what content gets cached and how long the content remains cached. Traffic can be load balanced across multiple origins, using proximity and network latency to determine the most efficient destination for each content request.

The content delivery network service may include video delivery services. In an embodiment, the video delivery services provide high quality video streaming through a bundled platform that combines storage, transcoding, distribution, and playback functionalities.

In an embodiment, caching service can include automatic static content caching, cache purging, and tiered caching. As noted above, static content caching can conserve CPU resources and bandwidth providing static content from the geographically distributed network of data centers. In an embodiment, cache purging services using cache-tags stored as metadata with cached objects allows for purging an entire cache or a single file. In an embodiment, using tiered caching, content served from adjacent data centers can reduce cache-miss rates, server load, and end-to-end latency.

Website optimization services can include asynchronous resource loading, image optimizations, and mobile optimizations. Asynchronous resource loading can allow multiple resources (e.g., images, scripts, etc.) to be loaded simultaneously rather than sequentially. Image optimizations can include resizing images from a single-source image master based on a type of user device and a connection speed. Images can be manipulated by dimensions (e.g., screen size), compression ratios, and format (e.g., WebP conversion where supported). Image optimizations can also include applying both "lossless" and "lossy" image optimizations to remove unnecessary bytes from images. Mobile optimizations can include detecting a browser type of a user device and optimizing performance for the particular type of user device. This can improve the performance of images when a website is accessed via a mobile connection.

The load balancing services may provide local and global load balancing to reduce latency by load balancing traffic across multiple servers or by routing traffic to the closest geolocation region. For example, requests for dynamic content are sourced from origin servers that are either closest to the user or meet specific weighted requirements.

The load balancing services may also provide health checks of servers with fast failover to rapidly route users away from failing servers. For example, through periodic HTTP/HTTPS requests, monitoring can be configured for specific URLs with customizable intervals, timeouts, and status codes. Availability monitoring can check the health of origin servers (e.g., as often as every 15 seconds), with reporting via email notifications and a REST API. Thus, when an origin server is marked as unhealthy, multi-region failover can route or reroute traffic to the next available healthy server.

Network congestion and unreliable connections can result in slow load times of websites. To address these issues, intelligent routing services can use real-time network intelligence to route traffic through the fastest network paths, while maintaining open, secure connections to eliminate latency imposed by connection-setup. For example, based on network conditions, requests can be routed to avoid congested network paths and/or unreliable connections.

Protocol management services include an IPv4-to-IPv6 translation gateway that can allow any website to be available over IPv6 even when a site's origin network does not yet support the IPv6 protocol. In an embodiment, services that require IPv4 support can use a Pseudo IPv4 service, where an HTTP header is added to requests established over IPv6 with a "pseudo" IPv4 address. In such an embodiment, using a hashing algorithm, Pseudo IPv4 will create a Class E IPv4 address which will produce the same output for the same input; the same IPv6 address will result in the same Pseudo IPv4 address.

A DDoS detection and mitigation service detects and mitigates against DDoS attacks. DDoS attacks may be identified in several ways that may be different based on the type of attack. Many DDoS attacks involve sending a large amount of traffic of a certain type to an intended target. The DDoS detection may determine when there is an abnormal amount of traffic that is destined to a particular destination (e.g., the traffic spikes from what is normally encountered). The DDoS detection may sample and analyze the traffic looking for inconsistencies and establish a threshold amount of what the normal traffic rate is for a domain and/or IP address and determine when traffic exceeds that threshold. Traffic rates may be individual and separate for a compute server and/or data center and a DDoS attack may be identified for each separate compute server and/or data center; or a DDoS can be identified through an aggregation of traffic across all compute servers and data centers. By way of a specific example, a DDoS attack may be detected by using one or more parameters that exceed a threshold, including one or more of the following to a particular IP address and/or domain: the number of packets, the amount of bandwidth, the number of User Datagram Protocol (UDP) packets/second, the number of Transmission Control Protocol (TCP) packets/second, the number of connections opened, the number of failed connections, and the ratio of successfully opened connections versus failed connections. These are just examples as there may be other parameters used in combination with, or in lieu of, the above to detect a DDoS attack. For example, the distributed cloud computing network 120 may detect if a domain and/or IP address is unreachable due to a heavy load, which may be an indication of a DDoS attack. As another example, the detection of a spike in metrics pertaining to a page or a resource request may be an indication of a DoS attack (e.g., a particular request header, cookie, size of the request, non-standard control characters, many GET parameters, a large number of POST parameters, etc.). The DDoS mitigation may create rules to filter packets that meet certain criteria and install them in a firewall for dropping the packets.

Secure session support services (e.g., Secure Socket Layer (SSL) and Transport Layer Security (TLS) support) may be provided that allow for SSL to operate in different modes depending on the level of security required and the amount of user configuration. For example, a flexible secure session service encrypts traffic from the distributed cloud computing network 120 to a client device, but not from the distributed cloud computing network 120 to an origin server, while a full secure session service encrypts the traffic from the distributed cloud computing network 120 to the origin server and the client device.

Web application firewall services can run in real-time to prevent automated attacks, SQL injection, XSS JavaScript injections and other real-time POST actions (e.g., cross-site scripting, cross-site forgery requests, etc.). The web application firewall services can contain rules to thwart attacks commonly seen in popular applications, including: WordPress, Magento, Drupal, PHP, Joomla, etc. In an embodiment, web application firewall services allow an administrator to import their own rules and write custom rules, as well as utilize system-generated rules that are automatically updated when new security vulnerabilities are identified or detected.

Threat blocking and privacy protection security services can include reputation-based threat protection that block known malicious threats, comment spam protection that block spammers from posting on a website, and content scraping protection that protect content (e.g., text, images, email addresses) from web scrapers. Threat blocking security services can also block or present challenges to users by country, IP address, or autonomous system number. Threat blocking security services can also provide user agent blocking to allow a user to create a rule to block or challenge a specific User Agent from accessing a domain, or a zone lockdown to allow the whitelisting of specific IP addresses and IP ranges.

Access control security services can include multi-user access, role-based access, and single sign-on support. Multi-user access allows an administrator to invite other users to manage the account as an administrator. In an embodiment, invited administrators can have full control over the account except for managing members and changing billing information. Role-based access enables organizations to collaborate across one account and use roles-based permissions to control access. In an embodiment, each user is assigned an individual API key and can use two-factor authentication to protect their own account. Single sign-on support allows for centralized identity and access management by allowing owners to set up and define who can access their accounts with their chosen identity provider.

Access control security services can also enable a user or administrator to monitor user access and change logs. For example, the system can log recent logins, access requests, and policy changes, and provide information indicating affected users, associated IPs, domains, actions taken, and timestamps.

Payment Card Industry Data Security Standards (PCI DSS) is a set of security standards designed to ensure that businesses that accept, process, store, or transmit credit card information maintain a secure environment. In an embodiment, by enabling web application firewall and Modern TLS Only mode ensures that a business remains in compliance with the latest PCI DSS standards.

DDoS attacks can be difficult to mitigate when they originate from many unique IP addresses and mimic legitimate traffic. Rate limiting services can protect against such DDoS attacks, as well as protect sensitive information against brute-force login attempts and other types of abusive behavior. In an embodiment, rate limiting provides the ability to configure thresholds, define responses, and obtain information about specific URLs of websites, applications, or API endpoints. Examples of thresholds can include allowing a certain number of requests per minute from each unique IP address, a certain number of login attempts, etc. Example response configurations can include enabling mitigating actions (e.g., challenges or CAPTCHAS), response codes, etc. Implementation of rate limiting service can reduce bandwidth usage by eliminating unpredictable traffic spikes or attacks.

In an embodiment, the distributed cloud computing network 120 includes one or more control servers that are operated by the service. The control server(s) provide a set of tools and interfaces for the customers and is accessible over the Internet. For example, the control server(s), among other things, allow the customer to configure the performance services and/or security services including specifying one or more IP addresses and the services and/or functions to apply to those IP address(es). The control server(s) can also configure other settings for the performance services and/or security services (e.g., create/apply firewall rules, caching functions, image optimization settings, load balancing settings, mobile device settings, threat protection, DDoS management/trigger, rate limiting rules, etc.). The settings can be selectively applied to one or more of their IP addresses, pages, and/or resources.

In the preceding description, numerous specific details are set forth to provide a more thorough understanding. It will be appreciated, however, by one skilled in the art that embodiments may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

The techniques shown in the figures can be implemented using code and data stored and executed on one or more electronic devices (e.g., a compute server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
    mapping a plurality of egress IP addresses to one or more groupings, wherein the plurality of egress IP addresses are anycast IP addresses for which a plurality of compute servers of a distributed cloud computing network share, wherein the plurality of egress IP addresses are to be used as source IP addresses of the distributed cloud computing network when transmitting traffic to destinations external to the distributed cloud computing network, and wherein the map of the plurality of egress IP addresses to the one or more groupings is made available to destinations external to the distributed cloud computing network;
    receiving, at a first compute server of the plurality of compute servers of the distributed cloud computing network, traffic originating from a client device that is destined to a destination external to the distributed cloud computing network, wherein the first compute server is part of a first data center;
    selecting an IP address out of the plurality of egress IP addresses, wherein the selection is based on one or more characteristics applicable for the received traffic and the map of the plurality of egress IP addresses to the one or more groupings;
    determining that an exit data center is expected to receive return traffic for the received traffic originating from the client device that is destined to the destination external to the distributed cloud computing network, wherein the exit data center is different from the first data center;
    proxying the received traffic from the first data center to the exit data center; and
    transmitting the received traffic to the destination external to the distributed cloud computing network, wherein the transmitted traffic uses the selected IP address as a source IP address.

2. The method of claim 1, wherein the map of the plurality of egress IP addresses is to geographic locations, wherein the one or more characteristics applicable for the received traffic includes a geolocation of the received traffic, and wherein the selected IP address is selected based on the geolocation of the received traffic and the map of the plurality of egress IP addresses.

3. The method of claim 2, wherein the geolocation of the received traffic includes a jurisdiction, and wherein selecting the IP address out of the plurality of egress IP addresses includes determining that the selected IP address is the same jurisdiction.

4. The method of claim 2, wherein the selected IP address is associated with a data center that has a closest distance to a determined geolocation of the destination external to the distributed cloud computing network.

5. The method of claim 2, wherein the first compute server determines the one or more characteristics applicable for the received traffic including the geolocation of the received traffic, wherein determining the geolocation of the received traffic includes accessing a public database to determine the geolocation of the received traffic based on a source IP address of the received traffic.

6. The method of claim 2, wherein the first compute server determines the one or more characteristics applicable for the received traffic including the geolocation of the received traffic, wherein determining the geolocation of the received traffic includes requesting a location from the client device.

7. The method of claim 2, wherein the map of the plurality of egress IP addresses to geographic locations is made available to a public database that is available to the destinations external to the distributed cloud computing network.

8. The method of claim 2, wherein the map of the plurality of egress IP addresses to geographic locations is made available for download from the distributed cloud computing network to the destinations external to the distributed cloud computing network.

9. The method of claim 1, further comprising:
    receiving at a second compute server of a plurality of compute servers of the distributed cloud computing network, return traffic from the destination external to the distributed cloud computing network, wherein the return traffic is directed to the selected IP address, and wherein the second compute server is part of the exit data center;
    determining, at the second compute server, that the first compute server transmitted the traffic to the second compute server; and
    forwarding the return traffic from the second compute server to the first compute server.

10. A non-transitory machine-readable storage medium that provides instructions that, when executed by a processor, causes said processor to carry out the following operations:
    mapping a plurality of egress IP addresses to one or more groupings, wherein the plurality of egress IP addresses are anycast IP addresses for which a plurality of compute servers of a distributed cloud computing network share, wherein the plurality of egress IP addresses are to be used as source IP addresses of the distributed cloud computing network when transmitting traffic to destinations external to the distributed cloud computing network, and wherein the map of the plurality of egress IP addresses to the one or more groupings is made available to destinations external to the distributed cloud computing network;
    receiving, at a first compute server of the plurality of compute servers of the distributed cloud computing network, traffic originating from a client device that is destined to a destination external to the distributed cloud computing network, wherein the first compute server is part of a first data center;
    selecting an IP address out of the plurality of egress IP addresses, wherein the selection is based on one or more characteristics applicable for the received traffic and the map of the plurality of egress IP addresses to the one or more groupings;
    determining that an exit data center is expected to receive return traffic for the received traffic originating from the client device that is destined to the destination external to the distributed cloud computing network, wherein the exit data center is different from the first data center;
    proxying the received traffic from the first data center to the exit data center; and
    transmitting the received traffic to the destination external to the distributed cloud computing network, wherein the transmitted traffic uses the selected IP address as a source IP address.

11. The non-transitory machine-readable storage medium of claim 10, wherein the map of the plurality of egress IP addresses is to geographic locations, wherein the one or more characteristics applicable for the received traffic includes a geolocation of the received traffic, and wherein the selected IP address is selected based on the geolocation of the received traffic and the map of the IP addresses.

12. The non-transitory machine-readable storage medium of claim 11, wherein the geolocation of the received traffic includes a jurisdiction, and wherein selecting the IP address out of the plurality of egress IP addresses includes determining that the selected IP address is the same jurisdiction.

13. The non-transitory machine-readable storage medium of claim 11, wherein the selected IP address is associated with a data center that has a closest distance to a determined geolocation of the destination external to the distributed cloud computing network.

14. The non-transitory machine-readable storage medium of claim 11, wherein the first compute server determines the one or more characteristics applicable for the received traffic including the geolocation of the received traffic, wherein determining the geolocation of the received traffic includes accessing a public database to determine the geolocation of the received traffic based on a source IP address of the received traffic.

15. The non-transitory machine-readable storage medium of claim 11, wherein the first compute server determines the one or more characteristics applicable for the received traffic including the geolocation of the received traffic, wherein determining the geolocation of the received traffic includes requesting a location from the client device.

16. The non-transitory machine-readable storage medium of claim 11, wherein the map of the plurality of egress IP addresses to geographic locations is made available to a public database that is available to the destinations external to the distributed cloud computing network.

17. The non-transitory machine-readable storage medium of claim 11, wherein the map of the plurality of egress IP addresses to geographic locations is made available for download from the distributed cloud computing network to the destinations external to the distributed cloud computing network.

18. The non-transitory machine-readable storage medium of claim 10, wherein the operations further comprise:
   receiving at a second compute server of a plurality of compute servers of the distributed cloud computing network, return traffic from the destination external to the distributed cloud computing network, wherein the return traffic is directed to the selected IP address, and wherein the second compute server is part of the exit data center;
   determining, at the second compute server, that the first compute server transmitted the traffic to the second compute server; and
   forwarding the return traffic from the second compute server to the first compute server.

\* \* \* \* \*